(12) United States Patent
Taylor, III et al.

(10) Patent No.: US 7,918,432 B2
(45) Date of Patent: Apr. 5, 2011

(54) CONICAL WASHER SPRING SUPPORT

(76) Inventors: James Octavius Taylor, III, Pasco, WA (US); Klaus Peter Redmann, Richland, WA (US); Bharat Vallabhdas Makadia, Beaverton, OR (US); Kirk Vincent Leonardi, Richland, WA (US)

( * ) Notice: Subject to any disclaimer, the term of this patent is extended or adjusted under 35 U.S.C. 154(b) by 685 days.

(21) Appl. No.: 11/702,346

(22) Filed: Feb. 5, 2007

(65) Prior Publication Data
US 2007/0182078 A1 Aug. 9, 2007

Related U.S. Application Data

(60) Provisional application No. 60/765,348, filed on Feb. 6, 2006.

(51) Int. Cl.
*F16M 13/00* (2006.01)
(52) U.S. Cl. .................................... 248/618; 248/566
(58) Field of Classification Search .................. 248/560, 248/566, 603, 618
See application file for complete search history.

(56) References Cited

U.S. PATENT DOCUMENTS
2,979,297 A * 4/1961 Suozzo .................. 248/542
* cited by examiner

*Primary Examiner* — Terrell McKinnon
*Assistant Examiner* — Erin Smith
(74) *Attorney, Agent, or Firm* — Floyd E. Ivey (57) ABSTRACT

This invention relates to a support or hanger utilizing a conical spring washer or set of conical spring washer displaying variable load characteristics. When installed, both types (support or hanger) allow for small movements in pipe, ductwork or equipment (PDE), thus, allowing for the thermal growth of PDE. Conventionally, helical coil spring supports are chosen to meet the load capacities of PDE but are reluctantly used because of their large size. By using conical spring washer s, the size of the support is substantially reduced making it a more useable device. A smaller, more compact design proves to increase the support/hanger's application making it more stable to place under piping and even under reciprocating motion equipment like generators and pumps. For small displacements, it is found that this invention behaves in the same manor as a conventional helical coil spring support under the same applied loads.

10 Claims, 10 Drawing Sheets

FIG. 1

FIG. 2
(Section 1-1)

FIG. 9
(Section 1-1)

FIG. 10

CONICAL WASHER SPRING SUPPORT

CROSS-REFERENCE TO RELATED APPLICATIONS

This application claims priority under 35 U.S.C. §119(e) to U.S. Provisional Patent Application Ser. No. 60/765,348 entitled Conical Washer Spring Support, filed Feb. 6, 2006. The complete disclosure of that application is herein incorporated by reference for all purposes.

U.S. Patent Documents

| U.S. Pat. No. | Issued Date | Inventor | Classification |
| --- | --- | --- | --- |
| 5009386 | June., 1989 | Berger | 248/613 |
| 4627593 | December, 1986 | A. J. Salter | 248/561 |
| 5944288 | August, 1999 | Whitney/Birch | 248/058 |
| 4238102 | December, 1980 | C. J. Salter | 248/543 |
| 4640487 | February, 1987 | A. J. Salter | 248/571 |
| 4206898 | June, 1980 | C. J. Salter | 248/561 |
| 3833194 | September, 1974 | A. J. Salter | 248/054 |
| 6517060 | February, 2003 | Z. A. Kemeny | 267/136 |
| 5564664 | October, 1996 | M. Oschwald | 248/288.51 |
| 5482406 | January, 1996 | E. J. Arlt, III | 405/195.1 |
| 5458313 | October, 1995 | R. Tie et al. | 248/613 |
| 4200256 | April, 1980 | P. H. Thiel | 248/548 |
| 3873079 | March, 1975 | F. Kuus | 267/162 |
| 3856242 | December, 1974 | B. D. Cook | 248/020 |
| 3770232 | November, 1973 | J. C. Blake | 248/021 |
| 3107905 | October, 1963 | C. D. Lucas | 267/001 |
| 2939663 | June, 1960 | L. S. Suozzo | 248/054 |

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

INTRODUCTION TO THE INVENTION

Variable spring supports/hangers are mechanical devices that exert an upward force on pipe, ductwork, or equipment (PDE) due to the PDE's deadweight (forces due to gravity) while allowing vertical translation of the PDE. The spring support performs one or more of six major functions:
1) To maintain support and accommodate movement of PDE subject to temperature changes.
2) To allow flexibility in PDE while maintaining support of the system's gravitational loads; thus, relieving the localized stresses throughout the system and at equipment connections.
3) To limit stresses on PDE and equipment nozzles due to their temperature changes.
4) To insure that unknown dynamic loads due to vibration and unbalanced forces during start-up do not damage PDE.
5) To correct small misalignment due to fabrication tolerances and/or displacement due to foundation settlement in PDE.
6) To facilitate meeting load requirements on load sensitive, rotating equipment (i.e. turbines, pumps, compressors) and non-rotating equipment (i.e. pressure vessels, heat exchangers, tanks).

BACKGROUND OF THE INVENTION

The function of a variable spring support is to support loads (forces) on PDE through the PDE's range of displacement that potentially can damage PDE while in operation. These forces include loads introduced to the PDE by pressure, temperature, vibration, wind, earthquake, dynamic transients and/or the PDE's own weight effects. The variable spring support should minimize one or more of the following typical problems related to industrial/commercial PDE:
1) Piping stress in excess of that permitted in ASME piping codes.
2) Leakage at pipe joints, ductwork joints or equipment connections.
3) Excessive forces and moments on connected equipment such as pumps and turbines.
4) Excessive stresses on adjacent supporting and restraining elements (e.g. adjustable supports or non-adjustable).
5) Resonance with imposed or fluid-induced vibrations.
6) Interferences due to thermal expansion and contraction with adjacent PDE.
7) Disengagement of piping from its supports.
8) Minimize the need for expansion loops in piping systems.

Mechanical and ASME piping codes and other international standard codes establish general rules for evaluating flexibility in piping systems. Spring supports are commonly utilized to increase flexibility on piping systems to satisfy allowable loads on equipment nozzles. It is imperative that loads be limited to meet applicable codes. The need to satisfy thermal and gravitational loads on sensitive equipment in a piping system is just as viable for movements measured in thousands of an inch as it is for large movements of several inches.

In contrast, hard supports (meaning supports without a spring), adjustable or non-adjustable, cannot provide flexibility to piping systems, correct piping misalignment or rectify problems with fabrication tolerances. Particular to rotating equipment, the result of using a non-adjustable support is often evident in seal damage, casing distortion and coupling misalignment. Static supports can result in over stressed conditions, which lead to expensive equipment failure, down time and even injuries. The cost of down time is usually more expensive than the equipment itself. Without the use of a spring, extra flexibility must be incorporated into a piping system by means of expansion loops to limit thermal displacements and substantially reduce excessive forces on equipment nozzles. Adjustable (type) supports such as a rod hanger or adjustable base elbow or base line support can cause more damage to equipment if they are not properly adjusted.

A spring support is cheap insurance against down time and expensive repairs. More importantly, spring supports extend PDE life. A spring support on load sensitive equipment and load sensitive fluid carrying media (i.e. glass lined piping) provides assurance that the proper support load is applied. This is particularly true during and after the initial stages of an industrial/commercial plant's operating cycle when external loads due to vibration and unbalanced loads tend to exceed the normal operating range.

Although coil spring supports have been proven in industry to solve critical stress problems in PDE, the application of coil spring supports can be improved. Coil springs do not directly address small movements effectively. Design engineers are reluctant to use a coil spring support where thermal pipe expansion and/or equipment displacements are small (e.g. 1/16"). Space limitations are often controlling factors near sensitive equipment. The helical wound coil spring support is too large an apparatus to typically install under piping or equipment in some instances. This limitation is also magnified by piping and HVAC insulation requirements that must be recognized as well.

Carbon steel coil springs are also vulnerable to corrosive agents in the air and from accidental liquid spills. On occasion, acid or caustic and corrosive materials spill from vessels, pumps and other equipment creating conditions where corrosive materials attack the spring support, thus, shorting its life. In the same way, air born particles such as salt air can attack the carbon steel material of the spring support. For corrosive services, protective coatings such as neoprene can be applied to the carbon steel coil spring. Manufacturers recommend neoprene only for operating temperatures up to 225 degrees Fahrenheit. It is also common practice to paint and galvanize carbon steel spring supports in used in corrosive environments as well. This may provide some protection but the spring itself cannot be inspected through routine maintenance while the spring is in service. No guarantee can be assured that the inner working parts are corrosion free while it is assembled.

SUMMARY OF THE INVENTION

In theory, the helical coil spring support/hanger manufactured today is a sufficient and viable choice when supporting industrial/commercial piping, HVAC ductwork and mechanical equipment (PDE). However, thermal and dynamic displacements in PDE are many times less than 1/4". Combine this fact with the physical restraint of limited space in which to support these displacements and this situation creates the need for a new innovation.

The proposed innovation uses conical springs (e.g. Belleville, etc.) as the deflection devise instead of a conventional helical coil spring. Disc springs have been virtually ignored in pipe support application. Disc springs offer an advantage over helical coil springs in satisfying small displacements in limited space within the piping system. By stacking conical springs and compressing them to a predetermined load, the Conical (Washer) Spring Support/Hanger can effectively maintain support of PDE through an operating displacement in the minimum amount of space. By using conical springs, the height of a typical spring support can be reduced by 30% to 50% for displacements from 0 to 5/8". This device is also suitable for placement under equipment such as pumps, turbines, compressor base plates, heat exchangers and vessels where a helical coil spring is impractical.

With the Conical (Washer) Spring Support/Hanger, corrosion is substantially minimized for most applications by using stainless steel or composite material conical springs which require little or no maintenance during the life of the support. The entire device can feasibly be made with corrosion free materials which provide cost savings as well as low maintenance during the life of the support. This offers a safer operational system.

Reciprocating, rotating and non-rotating load sensitive equipment such as pumps, turbines, heat exchangers, blowers, compressors, pressure vessels and storage tanks as well as compact skid mounted equipment have limits to the amount of forces and moments that may be applied to their nozzles. Often, the geometric orientation of the equipment's nozzle connections with respect to foundation pads and other structural obstructions demand the use of a compact spring support. When this type of situation exist, the Conical (Washer) Spring Support/Hanger will support the same load through the same range of movement as the helical coil spring support in a, substantially, smaller space. The following is one example: Plate and frame heat exchangers as described in API 662 standard emphasize the requirement of nozzle loading being kept to a minimum. Nozzles on load sensitive equipment are often located geometrically close to grade elevation (as well as other obstructions). A spring is designed to support the weight loads off the connecting equipment throughout its thermal transitional cycle. The obstructions that occur often limit the placement options for spring supports. Typically on plate and frame exchanger 4 nozzles exist—2 inlet nozzles and 2 outlet nozzles. The 2 nozzles at the bottom are typically one pipe diameter in distance from the top of the foundation (at the support plate of the exchanger) to the bottom of the pipe. The allowable load for an eight-inch inlet nozzle or outlet nozzle of an API 662 standard service nozzle is 246 lbs. of force with a 911 lb-ft moment. The piping systems usually contain reducers connecting to the equipment making the piping larger than the nozzle size of the equipment. The weight alone of this piping and its fluid is almost always greater than the allowable loading capacity that is specified by the code. A spring support is, obviously, required. The room for the spring support makes installation a challenge due to restricted space. The proposed invention is more suitable for direct installation in the limited space provided under the heat exchanger's lower nozzles.

To illustrate the difference between helical coil springs and conical washers, the minimum height of a helical coil spring could be limited to the distance of one times the pitch of the helical coil plus one coil rod diameter. This height would be greater than the height of one conical washer. The helical coil spring would have less load carrying capability. The helical coil spring force would be weak as its spring constant is dependent on its length or the amount it can compress. The helical coil spring could not obtain the high load settings required for small displacements simply by making it shorter. Its spring constant, by definition, is pounds per inch of compression which means the spring constant for a helical coil spring is linear. Its working range could not encompass the 25% variability requirement of the Manufacturers Standardization Society's (MSS) standard practice, MSS-SP58; which is a requirement set by the ASME code for pressure piping. In contrast, the conical washer's load deflection characteristics are different than a helical coil spring's load deflection. The spring constant for a conical washer is not linear. By simple observation of its geometry, it can be seen that helical coil springs are not as adaptable as conical washers.

Incorporating the characteristics of the conical washer into a spring support has definite advantages. The one or more advantages of the Conical Washer Spring Support's applications are summarized below:

1) The targeted deflection of the Conical Washer Spring Support/Hangers is 3/8" +/−. The helical coil spring support or hanger's target deflection ranges from 3/8" +/− to 6"+/−.
2) The optimal use of space is a desired design attribute. Conical Washer Spring Support/Hangers offer a very efficient use of space that a coil spring support does not offer. The more compact the support the more attractive the support is to the design engineer. (The less space taken by the spring support, the more space for PDE that is available).
3) When maintenance is an issue, the conical spring has a distinct advantage in it can be manufactured from corrosion free materials.

4) The Conical Washer Spring Support/Hangers is largely self-dampening, particularly stacking the conical washer in "series", giving good shock absorption and energy dissipation.
5) The characteristics of a conical washer allows for quick compensation of the load with a minimum of deflection-movement.

The advantages of the Conical Washer Spring Support are incorporated into its design with one or more of the following features:

1) To capture deflections of ⅜" or smaller over a range of loads, the design incorporates the use of conical washers which provides the required support load while maintaining the 25% variability requirements of the MSS_SP58 code.
2) The overall height of the pre-loaded Conical Spring Washer Support maintains the requirements of the MSS-SP58 standard above while still maintaining heights of ½ to ⅔ that of a conventional helical coil type spring support.
3) Assuring a corrosion and maintenance free machine, the conical spring washer is availably made of a wide range of materials including stainless steel. When such conditions are required, the entire support can be manufactured with stainless steel as well.
4) Because the disc springs are of an annular shape, the force transmission is concentric. Simple load and deflection adjustment can be accomplished by adding or removing individual discs. This simple spring alteration offers a desired performance option of no deformation or fatigue under normal loads and high life cycles with dynamic loads.
5) Stacking the conical spring washers in 'series' to increase deflection while maintaining a compact design is a great advantage. In contrast, stacking the conical spring washers in 'parallel' reduces the amount of deflection but allows for greater loads while shortening the support even more. These combinations offer a wide variety of performance options. Disc springs (conical washers) have, virtually, no fatigue for normal load applications and high cycle life for dynamic load applications.

DETAILED DESCRIPTION OF THE INVENTION

Figure 1:
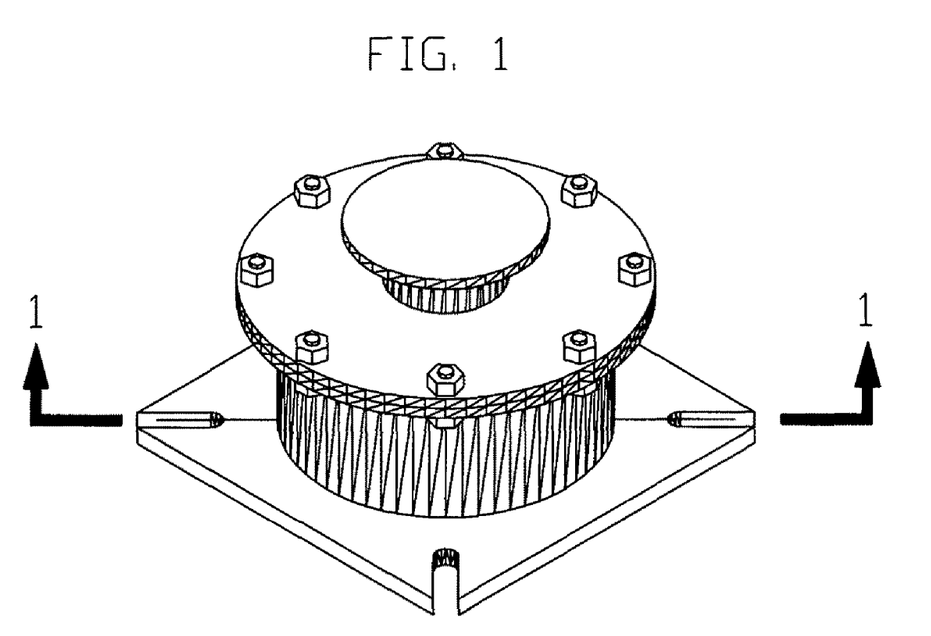
FIG. 1 is an isometric view showing a typical support type of a Conical Washer Spring Support.
Figure 2:
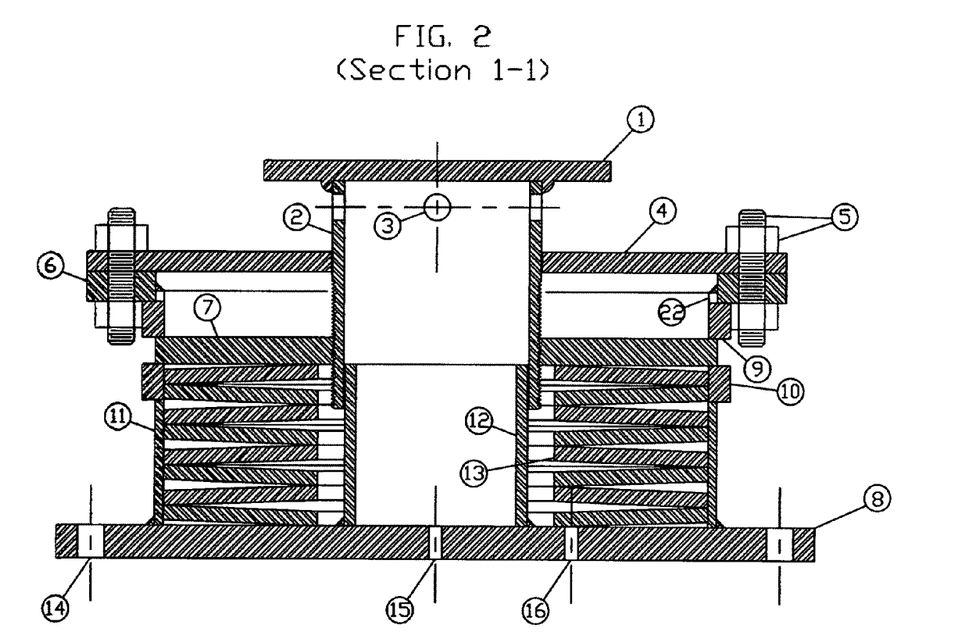
FIG. 2 is a sectional view of the Conical Washer Spring Support of FIG. 1 taken along line 1-1.
Figure 3:
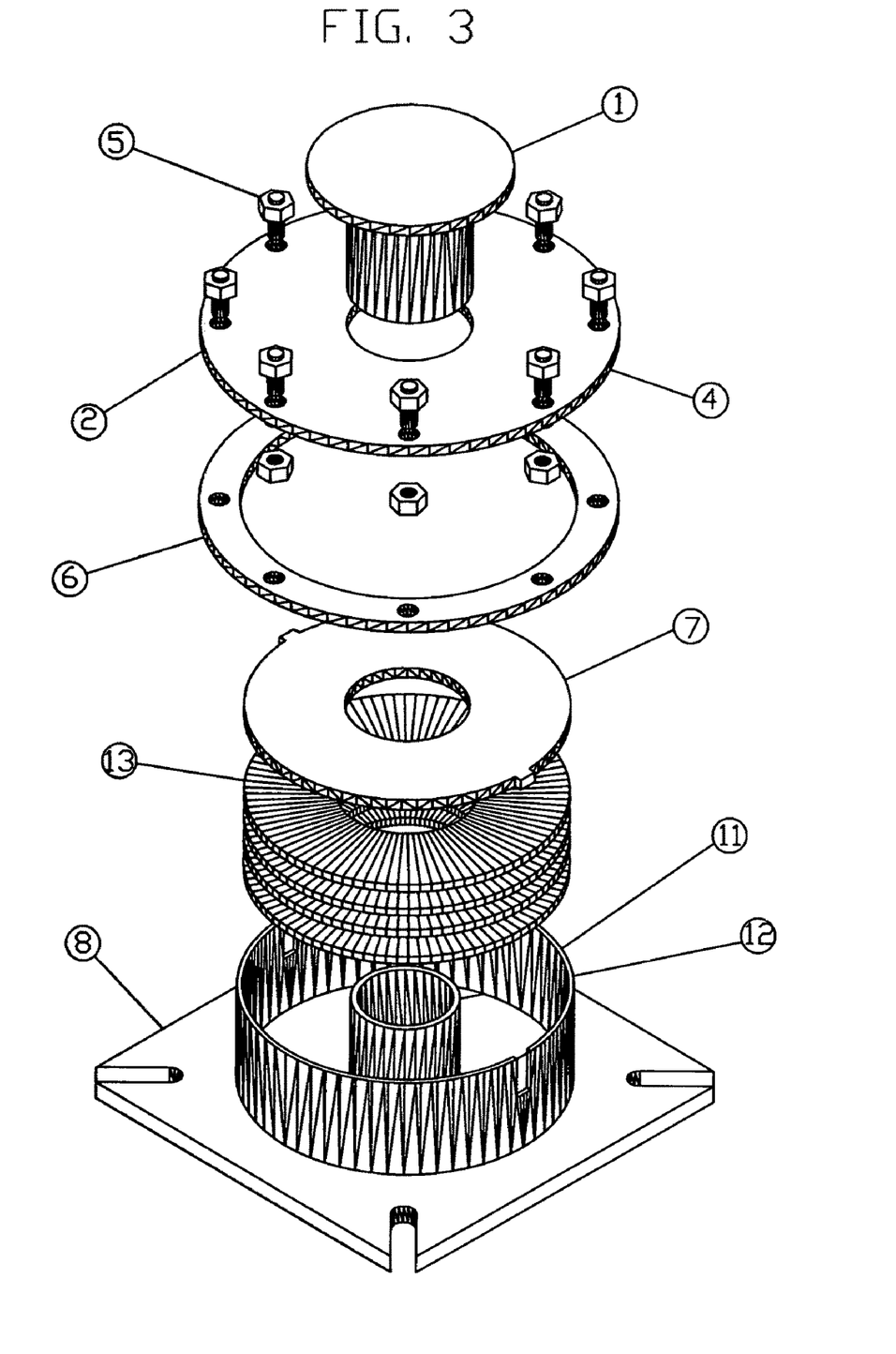
FIG. 3 is an exploded isometric view of the Conical Washer Spring Support of FIG. 1.
Figure 9:
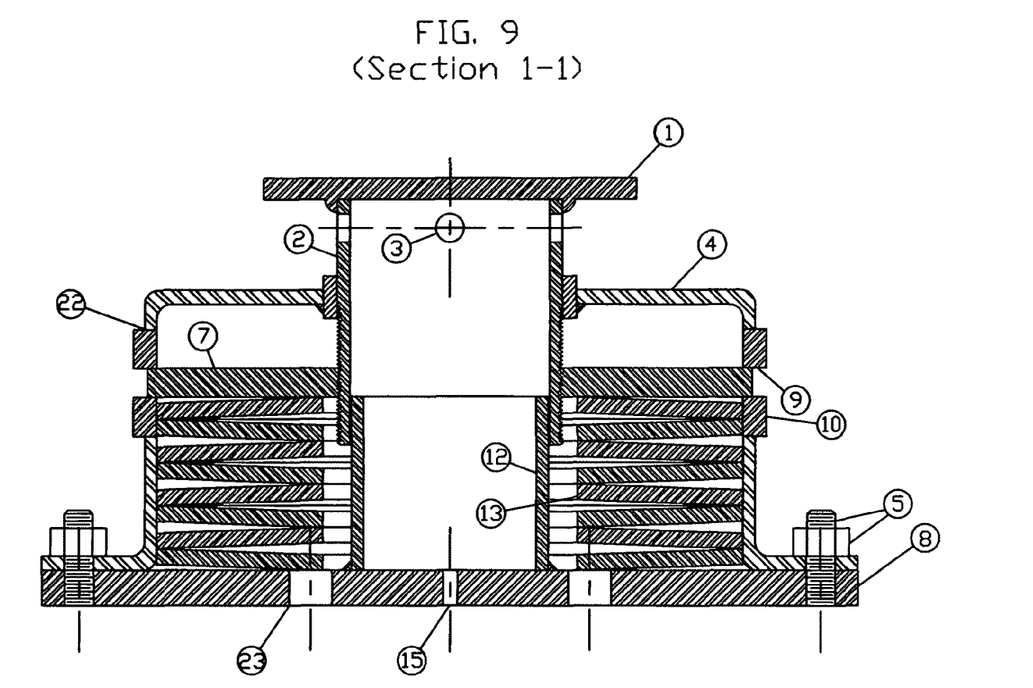
FIG. 9 is a sectional view of the Conical Washer Spring Support of FIG. 8 taken along line 1-1.

Referencing FIGS. 1, 2, & 3, each drawing is an example of a typical support type of a Conical Washer Spring Support 100. The load flange 1 is a flat disc with a concentric, circular lip 1A welded to the disc's bottom surface about the disc's centerline. As seen in FIG. 2 and FIG. 9, the load flange 1 fits transversely onto the load column 2 and is allowed to rotate freely on top of the load column's top edge 2B. The load flange 1 is guided and maintains its center position on top of the load column 2 by the loose fit between the circular lip's inner surface 1A and load column's top edge, outer surface 2B. The load column 2, assembled vertically, is a piston shaped cylinder machined flat on it's top edge 2B and threaded at its lower end 2A. When assembled, the threaded lower end 2A of the load column 2 engages the load plunger threaded inner diameter 7A, which in turn, is in contact with the top edge of the conical washer(s) 32, shown in FIG. 2. The load plunger 7 is a donut shaped flat plate with one load plunger lug 7C extending radially from its center on either side of its outer edge and threaded on its inner diameter 7A. From the plunger's centerline, these two load plunger lugs 7C, seen in FIG. 2 and FIG. 3, extend out, symmetrically. The load column's inner surface is guided by the smaller, cylindrical guide 12, which is centered on the base 8. At the upper end of the load column 2, four equally spaced, adjustment holes 3 are seen just under the load flange 1. The base 8 is a rectangular shaped, flat plate with four mounting slots 14 on each of the plate's four corners. In addition, two weep holes 15 and 16 are located in the base 8; one, through the base's centerline and the second through the space between the guide 12 and the housing 11. The guide 12 and the housing 11 are mounted vertically about the center axis of the base's top surface 8A. The housing 11 is a tubular shaped cylinder mounted, concentrically, about the smaller guide 12. The housing 11 extends from the top surface of the base 8A to the retaining ring 6 encasing the conical spring washer(s) 13 and the load plunger 7. At the upper end of the housing 11, two rectangular slots 22 are located on either of the housing's walls (at 180 degrees apart) to allow vertical translation of the load plunger's lugs 7C. Holding the load plunger 7 in place, the mechanical stops 9 and 10 are two rectangular shaped blocks placed at the top and bottom of the load plunger's lugs 7C within the housing's two sidewall slots 22. The retaining ring 6 is a flat ring shaped plate with bolt holes 6A appearing symmetrically around the ring's center. When mounted, the retaining ring 6 is placed transversely about the housing's circumference at its top edge 34. The housing cover 4 is a flat, donut shaped plate with equally spaced bolt holes 4E to match the center axis of each of the retaining ring's bolt holes 6A. The bottom surface of the housing cover 4C mounts flush against the top surface of the retaining ring 6B and is connected via the retaining stud bolts 5. At the center of the housing cover 4, a guide hole 4A is positioned to allow for the vertical translation of the load column 2.

An example of a method of assembling the Conical Washer Spring Support 100 of the support type is provided below. To assemble the Conical Washer Spring Support 100, the guide 12 is first welded to the base's top surface 8A. Second, the housing 11 is welded to the base's top surface 8A. Third, the retaining ring 6 is welded to the housing's upper edge 34. Fourth, the conical spring washer(s) 13 are loaded into the space between the guide 12 and the housing's inner surface 35. Depending on the load application, the conical spring washers 13 can be stacked convexly upon one another (with the larger, bottom surface 33 of each washer facing down) or stacked opposing each other (with the first washer's smaller, top surface mating 32 with the top surface of the second washer and the larger, bottom surface 33 of the second washer mating with the third, consecutively). Fifth, the load plunger 7 is placed over the top washer 13, making sure the outside load plunger lugs 7C match and penetrate through the inset slots 22 of the housing 11. Then, using a mechanical press, compress the conical spring washers 13 to a predetermined load. Sixth, once the desired predetermined load has been reached, the two mechanical stops 9 and 10 are placed into the inset slots 22, above and below the plunger lugs 7C, on both sides of the housing 11. Seventh, the housing cover 4 is secured into place by fastening the stud bolts 5 to the retaining ring 6 through the housing cover bolt holes 4E. Eighth, the load column 2 is inserted through the housing cover guide hole 4A and threaded into the load plunger 7 until it is guided on its inner diameter 7A by the guide 12. Finally, the load flange 1 is placed on top of the load column 2. However, the steps above may be performed in different sequences and in different combinations, not all steps being required for all examples of the Conical Washer Spring Support 100.

Figure 4:
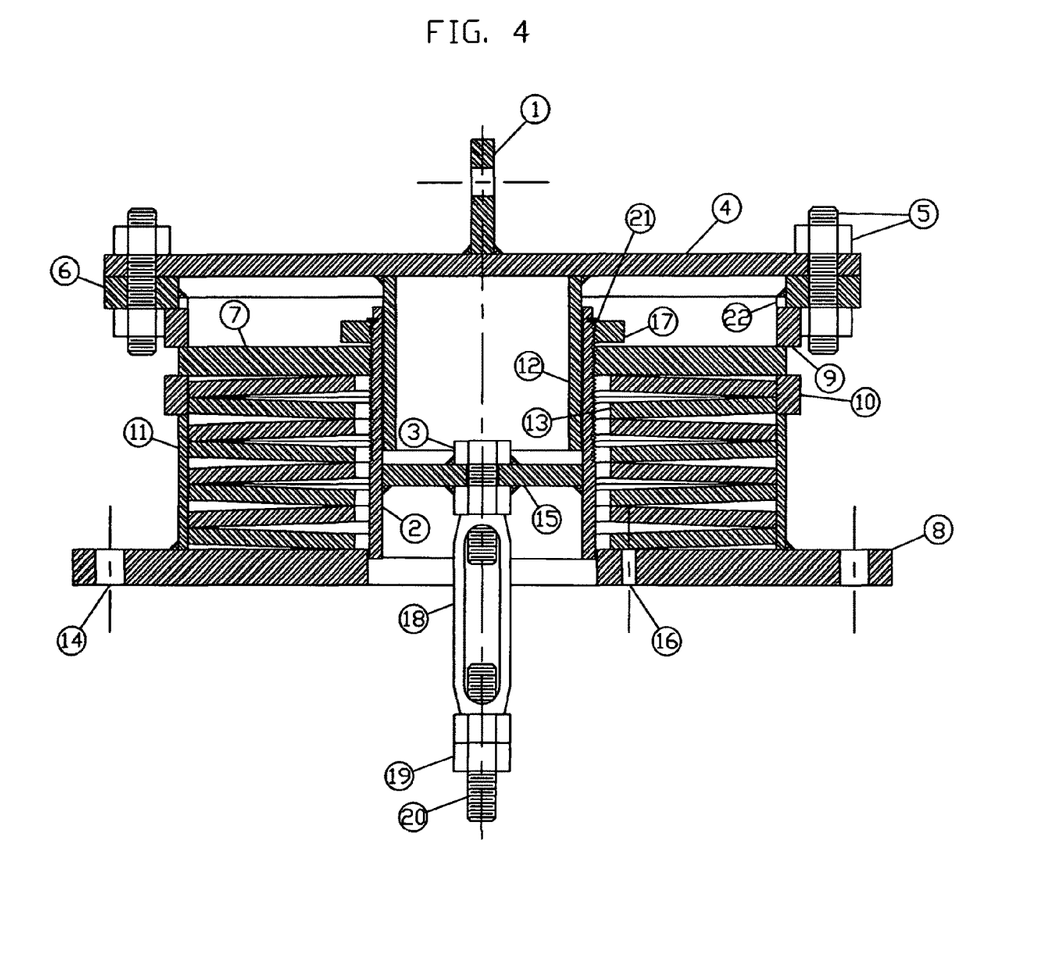
FIG. 4 is a sectional view showing a typical hanger type Conical Washer Spring Support taken along line 1-1 in FIG. 1.

Referring to FIG. 4, an example of a Conical Washer Spring Support of the hanger type is shown. All of the same parts shown in FIGS. 1, 2 & 3 are used interchangeably in the hanger shown in FIG. 4 with the following exceptions: The hanger housing cover 4B is a disc shaped plate with equally spaced bolt holes 4E positioned radially about the disc's center. Each bolt hole 4E is aligned with the centerlines of the retaining ring's bolt holes 6A (in the same manner as in FIG. 2). Hanger mounting lug 1B is a vertically mounted, flat plate with a single hanger bolt hole 1C through its top half. The hanger mounting lug's 1B bottom edge 1D is positioned transversely to the top surface of the hanger housing cover 4H at its center axis. In contrast to the FIG. 2 drawing, the guide 12 is mounted vertically to the bottom surface of the hanger housing cover 4J at the housing cover's center. The hanger load column 42, assembled vertically, is a piston shaped cylinder threaded toward its upper end 43. At the top of the hanger load column 43, a stop ring 17 is threaded and held in place by an e-ring 21 which prevents the hanger load column 42 from losing engagement with the plunger 7 when adjusted. When assembled, the threaded end 43 of the hanger load column 42 engages the load plunger's threaded inner diameter 7A, which in turn, is in contact with the top edge of the conical spring washer (s) 13. The hanger load column 42 translates vertically downward through the hanger guide hole 8B at the hanger base's 8A center. Connected to the inside surface of the hanger load column 44, the anchor 23 is disc shaped with a single anchor bolt hole 24 at its center. Through the anchor's bolt hole 24, an anchor lug bolt 25 is attached to the anchor 23. The hanger base 8A is a rectangular shaped, flat plate with mounting slots 14 appearing in each of the base's 8A four corners. At the hanger base's center, a hanger guide hole 8B is concentrically centered slightly larger than the hanger load column's 42 outside diameter. The hanger base 8A has one weep hole 16 through the space between the hanger guide hole 8B and the housing 11. A turnbuckle 18 is threaded onto the anchor lug bolt 25 and is held in place to prevent disengagement. The hanger or whole assembly is attached to the load via a rod 20 which attaches to the turnbuckle 18 and is held secure by a lock nut 19 as specified in the ASME piping code.

After the support is placed in service, (i.e. the load is attached to the turnbuckle 18), the mechanical stops 9 and 10 can be removed. Further adjustment is obtained by turning the hanger load column 42. A load indicator plate (to accurately adjust and measure the movement of the support) is attached to the housing 11 and measures the vertical translation of the load plunger's lugs 7C.

Figure 10:
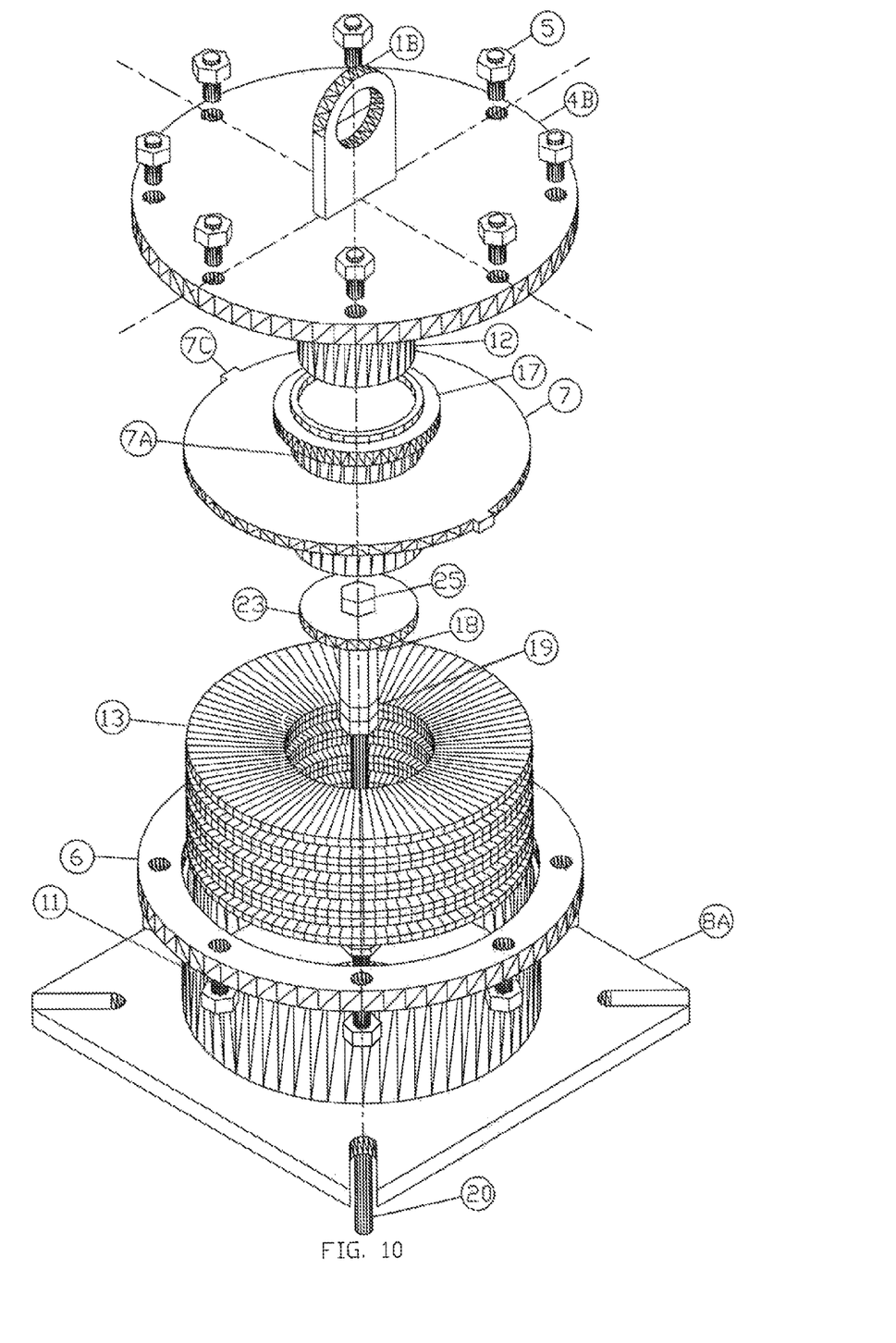
FIG. 10 is an exploded isometric illustration of the hanger seen in FIG. 4.

An example of a method of assembling the Conical Washer Spring Support 100 of the hanger type is provided below. To assemble the Conical Washer Spring Hanger 101, first, the housing 11 is welded, concentrically, about the center of the hanger base 8A. Second, the retaining ring 6 is welded to the upper, outer surface of the housing 34. Third, the guide 12 is welded to the bottom surface of the hanger housing cover 4J, concentrically, about the housing cover's center axis. Forth, the hanger mounting lug 1B is welded to the top surface of the hanger housing cover 4H at its center. Fifth, the turnbuckle 18 is bolted to the anchor 23 using the anchor lug bolt 25, the anchor 23 is welded to the inside surface of the hanger load column 42 and the load plunger 7 and stop ring 17 are threaded onto the hanger load column 42 locking them in place with the e-ring 21. Sixth, the conical spring washer(s) 13 are loaded to the inside diameter of the housing 35 on top of the hanger base's top surface 8D. Seventh, the hanger load column 42 with anchor 23 and anchor lug bolt 25 are lowered into place over the conical spring washers 13 so that the turnbuckle 18 is protruding through the hanger guide hole 8B in the hanger base 8A. (The load plunger's lugs 7C must align with the slots 22 in the housing 11.) Eighth, a mechanical press is used to compress the conical washer(s) 13 to the predetermined load height. Ninth, mechanical stops 9 and 10 are inserted into both sides of the housing's slots 22 above and below the load plunger's lugs 7C. Tenth, the hanger housing cover 4B is mounted onto the retaining ring 6. Finally, the hanger housing cover 4B is fastened to the retaining ring 6 using the hanger cover retaining stud bolts 5. However, the steps above may be performed in different sequences and in different combinations, not all steps being required for all examples of the Conical Washer Spring Hanger 101.

Figure 5:
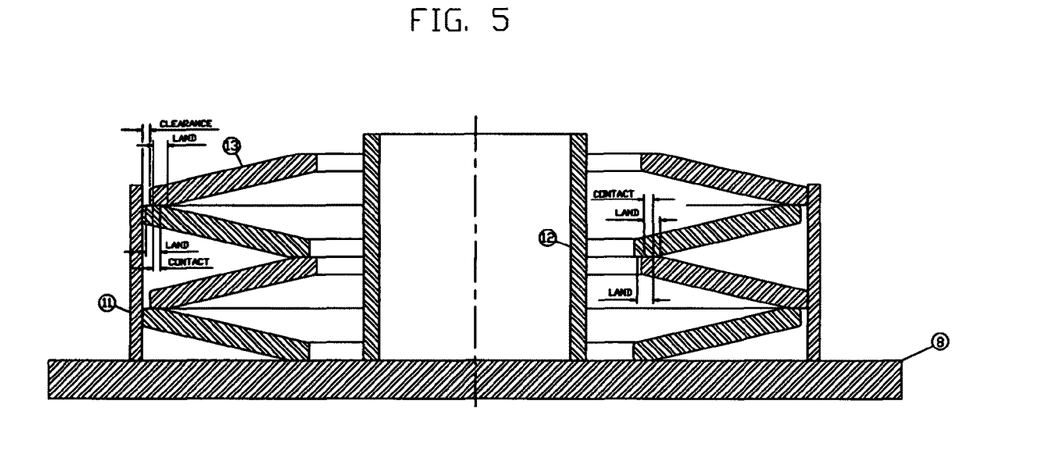
FIG. 5 is a sectional view of the Conical Washer Spring Support of FIG. 1 taken along line 1-1 in FIG. 1 showing how required clearances for guiding the conical washers may be maintained.

FIG. 5 shows, in detail, how the required spring clearances for guiding the conical washers 13 are maintained. The available contact surface 90 on the conical spring washer 13 is set to be at least twice the clearance between the inner diameter (I.D.) of the housing 35 and the outer diameter (O.D.) of the conical spring washers 13. This assures 100% contact between washers stacked in series.

Figure 6:
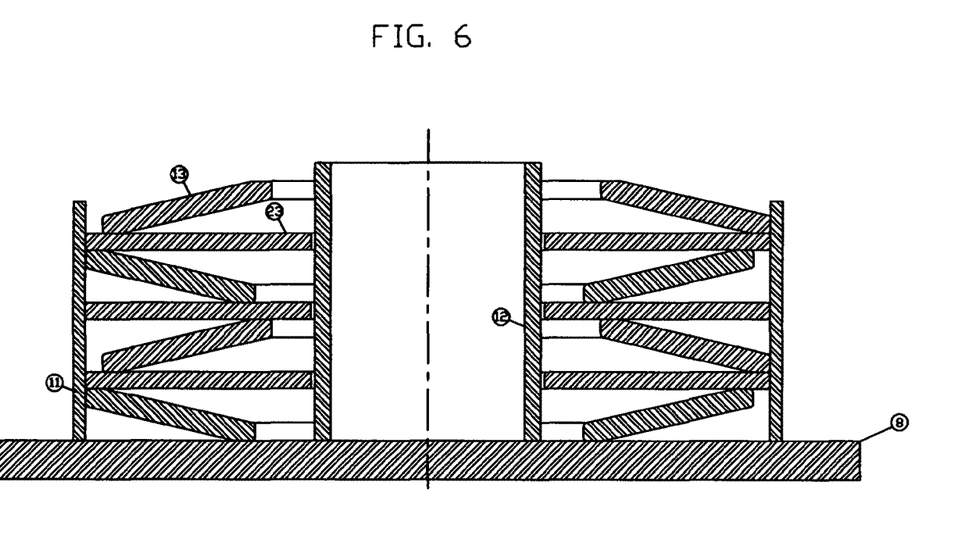
FIG. 6 is a sectional view of the Conical Washer Spring Support of FIG. 1, showing the use of flat washers between conical spring washers providing a bearing surface to maintain maximum contact at outer edge of conical spring washers as illustrated in FIG. 5.

FIG. 6 depicts an example of the use of flat washers 73 between the conical washers 13 providing a bearing surface to maintain maximum contact between the outer edge of conical spring washers 13 as illustrated in FIG. 5. This also allows greater flexibility in sizing the conical spring washers 13 while maintaining the clearance requirements for the outside diameter of the conical spring washers 13.

Figure 7:
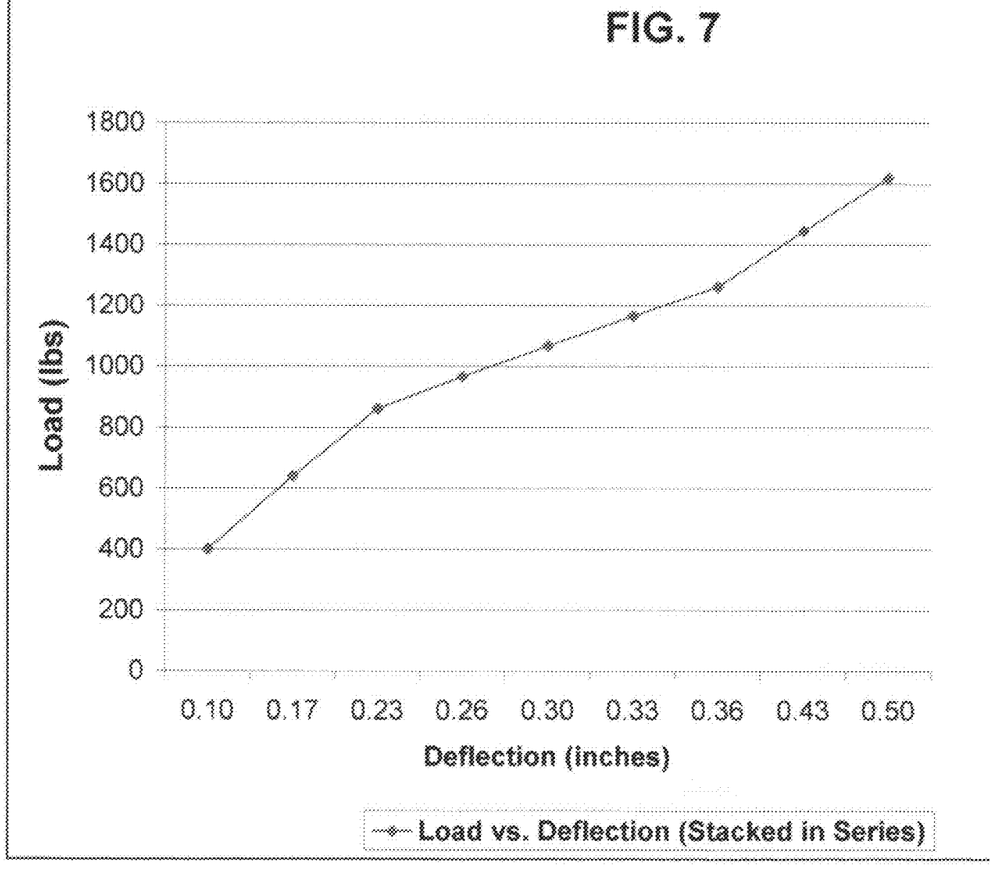
FIG. 7 is an example of a load vs. deflection graph showing a characteristic curve for a set of conical spring washers stacked in series.

FIG. 7 is a graph example of a characteristic load vs. deflection curve for a set of conical spring washers 13 stacked in series according to a specific design requirement. Alteration of spring performance as desired can be accomplished by adding or removing conical spring washers 13.

Figure 8:
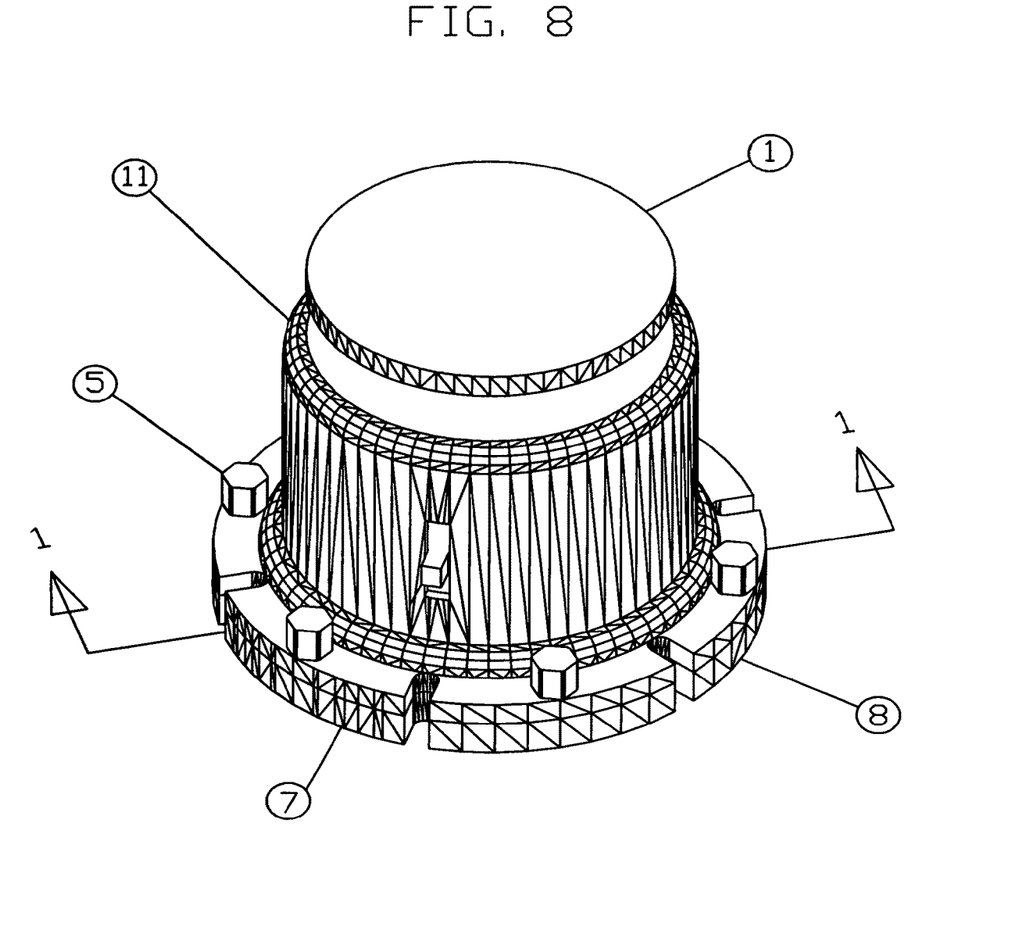
FIG. 8 is an isometric view showing another example of the Conical Washer Spring Support shown in FIG. 1.

The FIGS. 8 and 9 are an example of the same Conical Washer Spring Support shown in FIG. 1 with one exception; the housing cover 4 and retaining ring 6 have been replaced with a FW housing 4C which encases the conical spring washer s 13, the plunger 7 and the guide 12. The housing 4C also guides the load column 2 through the FW housing cover guide hole 4G at the center of the FW housing 4C. The FW housing 4C fastens to the base 88 with the FW mounting bolts 27 used in FIGS. 1, 2 & 3. The FW housing 4C example used in FIGS. 8 and 9 has a dome or cupped shape with mounting bolt holes 4L evenly spaced around its base flange 4D which is outwardly extending from the housing 4C. The base 88 is either circular or rectangular, as in FIGS. 1, 2 & 3, having bolt holes 89 spaced to match the FW housing's bolt holes 4L positioned radially about its center.

Assembling the Conical Washer Spring Support 102 in FIGS. 8 and 9, the housing 4C is, first, turned upside down. Second, the load plunger 7, followed by the conical spring washers 13 are lowered into the FW housing 4C using the same stacking procedure in the FIGS. 1, 2 & 3 assembly. Third, the mechanical stops 9 and 10 are positioned above and below the load plunger's lugs 7C inside the FW housing slots 22. Fourth, the FW base 88 and the guide 12, mounted to the base's top center 87, as in FIG. 2, are loaded upside down onto the conical spring washers 13. Fifth, the conical spring washers 13 are mechanically compressed, allowing the FW base 88 to be fastened to the FW housing 4C. Sixth, the housing 4C/base 88 unit is turned right side up and the load column 2 is lowered into the FW housing guide hole 4G at the housing's 4C top center. Finally, the load column 2 is rotated into position engaging the threads 7A of the load plunger 7 and the load flange 1 is placed on top of the load column 2.

The calculation of the load vs. deflection curve is based on formulas derived by J. O. Alemen and A. Laszlo. Their discussion is recorded in volume 58, pages 305-314 of "ASME Transactions", RP-58-10, 1936. Their method has been widely accepted throughout industry. Their derivation is based on elastic behavior on the assumption that radial stresses were negligible, the complete disclosure of which is herein incorporated by reference for all purposes.

Springs which produce near/or constant load verses deflection curves are overstressed. Therefore, it is the requirement and intention of this device that the selected spring sizes and their respective $H_0/T$ ratios generate load verses deflection curves that are below their material allowable stress levels at 100% compression of the spring's height.

Although Conical Washer Spring Supports and features of Conical Washer Spring Supports have been shown and described with reference to the foregoing operational principles and preferred embodiments, those skilled in the art will find apparent that various changes in form and detail may be made without departing from the spirit and scope of the claims. The present disclosure is intended to embrace all such alternatives, modifications and variances that fall within the scope of the appended claims.

What is claimed is:

1. A variable spring support for supporting an applied load through a predetermined range of displacement, comprising:
    a load flange (1) adapted to support an applied load;
    a load column (2), connected to a load flange (1), transmits the applied load to a load plunger (7);
    a housing (11) adapted to encase one or more conical washer springs (13) and flat washer sets (23), is connected to a base (8); the base (8) adapted for mounting to an external rigid support or structural member; and a guide (12), connected to the base (8), which provides a center support to the load column (2) and load plunger (7) during their linear translation through the housing (11) while the external load is applied;
    a land set on the flat washer sets (23) is set to be at least twice the clearance between an inner diameter of the outer housing pipe (11) and an outer diameter of the conical washers (13).

2. A variable spring hanger for supporting an applied load through a predetermined range of displacement, comprising:
    an anchor adapted to transmit the applied load, is affixed to a load column; a load column engages a load plunger; a load plunger adapted to engage one or more conical washer springs; one or more conical washer springs, which when deformed, compensates for the applied load and displacement; one or more flat washers, when placed between the conical, washer springs, provide an even contact area, distributes the load to the conical washer springs and corrects misalignments; an internal guide, attached to the housing, guide the load column through an opening in the base plate; a housing adapted to encase one or more conical spring washers and flat washer sets, is connected to a base; and a base adopted for mounting; the land set on the flat washer sets (23) is set to be at least twice the clearance between an inner diameter (ID.) of the outer housing pipe (11) and an outer diameter (O.D.) of the conical washers (13).

3. A variable spring support for supporting an applied load through:
    a. the load flange (1) is primarily planar and is fit transversely onto the load column (2);
    b. the load column (2), transmits the applied load to a load plunger (7);
    c. the load column's inner surface is guided by the smaller, cylindrical guide (12), which is centered on the base (8); at the upper end of the load column (2), four equally spaced, adjustment holes (3) are seen under the load flange (1); the plunger (7) is adapted to engage one or more conical washer springs (13) which, when deformed, compensates for the applied load and displacement;
    d. one or more flat washers (23), when placed between the conical washer springs (13), provide an even contact area, distributes the load to the conical washer springs (13) and corrects misalignments;
    e. the housing (11) has an inside diameter and is adapted to encase one or more conical washer springs (13) and flat washer sets (23) having an outside diameter; the housing (11) inner diameter is greater then the washer springs (13) and flat washer sets (23) outer diameter; the guide (12) and the housing (11) are mounted vertically about the center axis of the base's (8) top surface;
    f. at the upper end of the housing (11), two rectangular slots (22) are located on either of the housing's walls, 180 degrees apart, to allow vertical translation of the load plunger's side lugs 7C;
    g. holding the load plunger (7) in place, mechanical stops (9) and (10) are two rectangular shaped blocks placed at the top and bottom of the load plunger's lugs (7C) within the housing's two sidewall slots (22) and are connected to the base (8);
    h. a retaining ring (6) is a flat ring shaped plate with bolt holes (6A) appearing symmetrically around the ring's center; when mounted, the retaining ring (6) is placed transversely about the housing's circumference at its top edge;
    I. a housing cover (4) mounts flush against the top surface of the retaining ring (6) and is connected via the retaining stud bolts (5); at the center of the housing cover (4), a guide hole (4A) is positioned to allow for the vertical translation of the load column (2);
    j. the land set on the flat washer sets (23) is set to be at least twice the clearance between an inner diameter of the outer housing pipe (11) and an outer diameter of the conical washers (13);
    k. the load flange 1, fitting transversely onto the load column 2, rotates freely on top of the load column's top edge 2B; the load flange 1 is guided and maintains its center position on top of the load column 2 by the loose fit between the circular lip's inner surface 1A and load column's top edge, outer surface 2B.

4. A variable spring support from claim 3 further comprising:
   a. the load flange (1) is a flat disc with a concentric, circular lip (1A) welded to the disc's bottom surface about the disc's centerline;
   b. the load column (2), assembled vertically, is a piston shaped cylinder machined flat on its top edge, mating with the load flange (1) and threaded at its lower end; when assembled, the threaded end (2A) of the load column (2) engages the load plunger (7);
   c. the load plunger (7) is a donut shaped flat plate with one tab (7C) extending radially from its center on either side of its outer edge and threaded on its inner diameter (7A); from the plunger's centerline, these two tabs (7C) extend out, symmetrically;
   d. the housing (11) is a tubular shaped cylinder mounted, concentrically, about the smaller guide (12); the housing (11) extends from the top surface of the base (8) to a retaining ring (6) encasing the conical washer (s) (13) and the load plunger (7);
   e. the base (8) is a rectangular shaped, flat plate with four mounting slots (14) on each of the plate's four corners adapted for mounting to an external rigid support or structural member;
   f. the guide (12), connected to the base (8), provides a center support to the load column (2) and load plunger (7) during the load column (2) and plunger's (7) linear translation through the housing (11) while the external load is applied;
   g. the housing cover (4) is a flat, donut shaped plate with equally spaced bolt holes (4E) to match the center axis of each of the retaining ring's bolt holes (6A); the housing cover (4) is connected against the top surface of the retaining ring (6) via retaining stud bolts (5).

5. A variable spring hanger for supporting an applied load through a predetermined range of displacement, comprising:
   a. an anchor (23) connected to the inside surface of a load column (42); a lug bolt (3) is attached to the anchor (23);
   b. a turnbuckle (18) is threaded onto the lug bolt (3) and is held in place to prevent disengagement;
   c. the hanger is attached to the load via a rod (20) which attaches to the turnbuckle (18) and is held secure by a lock nut (19) as specified in the ASME piping code; the anchor (23) is adapted to transmit the applied load, is affixed to a load column (42);
   d. the load column (42) engages a load plunger (7); the load plunger (7) is adapted to engage one or more conical washer springs (13); one or more conical washer springs (13), which when deformed, compensates for the applied load and displacement;
   e. one or more flat washers (73), when placed between the conical washer springs (13) provide an even contact area, distributes the load to the conical washer springs (13) and corrects misalignments;
   f. the conical washers (13) provide a bearing surface to maintain maximum contact between the outer edge of conical washers (13) also allows greater flexibility in sizing the conical washers (13) while maintaining the clearance requirements for the outside diameter of the conical washers (13));
   g. an internal guide (12) is mounted vertically to the bottom surface of the housing cover (4B), at the housing cover's center, by a generally immovable rigid means including bolts;
   h. a mounting lug (1B) is for mounting to an external rigid support or structural member; the mounting lug's bottom edge is positioned transversely to the top surface of the housing cover (4B) at its center axis, guide the load column (42) through an opening (8B) in the base plate (8A);
   I. the housing (11) the housing (11) is welded, concentrically, about the center of the base plate (8A), is adapted to encase one or more conical spring washers (13) and flat washer (73) sets and is connected to the base plate (8A); at the base plate's (8A) center, a guide hole (8B) is concentrically centered slightly larger than the load column's (42) outside diameter in order to stay in contact with the load column (42) through its vertical translation;
   j. the land set on the flat washer sets (23) is set to be at least twice the clearance between an inner diameter (ID.) of the outer housing pipe (11) and an outer diameter (O.D.) of the conical washers (13).

6. A variable spring hanger from claim 5 further comprising:
   a. the anchor (23) is disc shaped with a single bolt hole (24) at its center; the lug bolt (3) is attached to the anchor (23) through the anchor's bolt hole (24);
   b. the placement of one or more flat washers (73) between the conical washer springs (13) provides an even contact area, the distributes the load to the conical washer springs (13) and corrects misalignments, thus maintaining required spring clearances for guiding the conical washers (13) and assuring contact between washers (13) stacked in series;
   c. the housing cover (4B) is a disc shaped plate with equally spaced bolt holes (4E) positioned radially about the disc's center; each bolt hole (4E) is aligned with the centerlines of the retaining ring's bolt holes (6A);
   d. the lug (1B) is a vertically mounted, flat plate with a bolt hole (1C) through its top half;
   e. the base plate (8A) is a rectangular shaped, flat plate with four mounting slots (14) appearing in each of the base's four corners; the base plate (8A) is adapted for mounting to an external rigid support or structural member;
   f. after the load is attached to the turnbuckle (18)), the stops (9) and (10) can be removed; further adjustment is obtained by turning the load column (2); a load indicator plate, to accurately adjust and measure the movement of the support, is attached to the housing (11) and measures the vertical translation of the load plunger's lugs (7C).

7. A variable spring support comprising:
   a. a load flange (1); the load flange is fit transversely onto a load column (2);
   b. the load column (2), having a threaded end engages a load plunger (7), which in turn, is in contact with the top edge of at least one conical washer (13);
   c. the load column's inner surface is guided by a smaller cylindrical guide (12) which is centered on a base (8); at the upper end of the load column (2) are adjustment holes under the load flange (2);
   d. the guide (12) and a housing (11) are mounted vertically about the center axis of the base's top surface; the housing (11) extends from the top surface of the base (8) to a retaining ring (6) encasing the at least one conical washer(s) (13) and the load plunger (7); at the upper end of the housing (11), two rectangular slots (22) are located on either of the housing's walls 180 degrees apart to allow vertical translation of the load plunger's side lugs; the load plunger's lugs must align with the slots in the housing (11);

e. holding the load plunger (7) in place during assembly of the unit, are mechanical stops (9) and (10) which are two rectangular shaped blocks placed at the top and bottom of the load plunger's lugs within the housing's two sidewall slots (22);

f. when mounted, the retaining ring (6) is placed transversely about the housing's circumference at its top edge;

g. a housing cover (4) has bolt holes spaced to match the center axis of each of the retaining ring's bolt holes; a bottom surface of the housing cover (4) mounts flush against the top surface of the retaining ring (6) and is connected via retaining stud bolts (5); at the center of the housing cover (4), a guide hole is positioned to allow for the vertical translation of the load column (2);

h. spring clearances for guiding the conical washers are maintained at a land set on the at least one washer spring (13) to be at least twice the clearance between the inner diameter of the outer housing (11) and the outer diameter of the at least one conical washer(s) (13) to assure 100% contact between the at least one washer(s) when stacked in series.

8. A variable spring support from claim 7 further comprising:

a. the load flange (1) is a flat disk with a concentric, circular lip welded to the its bottom surface about the disk's centerline;

b. the load column (2) is assembled vertically, is a piston shaped cylinder machined flat on its top edge mating with the load flange (1);

c. the load plunger (7) is a donut shaped flat plate with one lug extending radially from its center on either side of its outer edge; from the plunger's (7) centerline, these two lugs or tabs extend out, symmetrically;

d. the adjustment holes under the load flange (1) are equally spaced;

e. the base (8) is a rectangular or circular in shape and is a flat plate, generally of rigid material and generally composed of metal, with four mounting slots on each of the plate's four corners; two weep holes (15) and (16) are located in the base (8); one, through the base's centerline: and the second through the space between the guide (12) and the housing (11);

f. the housing (11) is a tubular shaped cylinder mounted, concentrically, about the smaller guide (12);

g. the retaining ring (6) is a flat ring shaped plate with bolt holes appearing symmetrically around the ring's center;

h. the housing cover (4) is a flat, donut shaped plate with equally spaced bolt holes to match the center axis of each of the retaining ring's bolt holes;

I. the at least one conical washer (13) comprised of at least one set of two conical washers (13);

j. the load flange 1, fitting transversely onto the load column 2, rotates freely on top of the load column's top edge 2B; the load flange 1 is guided and maintains its center position on top of the load column 2 by the loose fit between the circular lip's inner surface 1A and load column's top edge, outer surface 2B.

9. A variable spring support from claim 8 further comprising:

a. there are four equally spaced adjustment holes under the load flange (1);

b. every pair of the at least one conical washers (13) comprising "n" conical washers (13) facing upturned "n" conical washers (13).

10. A variable spring support from claim 9 further comprising:

a. at least one flat washer (23) between every pair of the at least one conical washers (13) providing a bearing surface to maintain maximize contact between at outer edge of the at least one conical washers thus allowing greater flexibility in sizing of the at least one conical washers (13) while maintaining the clearance requirements for the outside diameter of the at least one conical washers (13);

b. the top mounting plate and top retaining ring are replaced with a single housing (11) which encases the at least one conical washer spring(s) (13), the plunger (7) and the guide (12); the housing (11) guides the load column (2) through an opening at the housing's top center; the housing (11) fastens to the base (8) with the mounting bolts (5); the housing (11) has a dome or cupped shape top with mounting bolt holes evenly spaced around its base flange; the base (8) is either circular or rectangular having bolt holes spaced to match the housing's bolt holes and loading slots (23) positioned radially about its center.

* * * * *

UNITED STATES PATENT AND TRADEMARK OFFICE
CERTIFICATE OF CORRECTION

PATENT NO.        : 7,918,432 B2
APPLICATION NO.   : 11/702346
DATED             : April 5, 2011
INVENTOR(S)       : Taylor et al.

It is certified that error appears in the above-identified patent and that said Letters Patent is hereby corrected as shown below:

Title Page item 76

Your Applicant respectfully requests the Patent Office to issue such correction as required to correctly identify inventor Redmann AS    KLAUS P. REDMANN Signed and Sealed this
Fourteenth Day of June, 2011

David J. Kappos
*Director of the United States Patent and Trademark Office*